United States Patent Office 3,758,475
Patented Sept. 11, 1973

3,758,475
PYRIDO[2,3-d]PYRIMIDIN-2-ONES
Goetz E. Hardtmann, Florham Park, N.J., and Hans Ott, Pfeffingen, Switzerland, assignors to Sandoz-Wander, Inc., Hanover, N.J.
No Drawing. Continuation-in-part of application Ser. No. 870,445, Oct. 20, 1969, which is a continuation-in-part of application Ser. No. 782,743, Dec. 10, 1968, both now abandoned. This application July 20, 1971, Ser. No. 164,453
Int. Cl. C07d 57/20
U.S. Cl. 260—256.4 F    15 Claims

ABSTRACT OF THE DISCLOSURE

Compounds are of the class of 1-substituted-4-aryl-pyrido[2,3-d]pyrimidin-2-ones, which are useful as anti-inflammatory agents. Intermediates for preparation include 1 - unsubstituted-4-aryl-pyrido[2,3-d]pyridimin-2-ones and pyridyl-phenyl ketone imines.

---

This application is a continuation-in-part of copending application Ser. No. 870,445, filed Oct. 20, 1969 which is in turn a continuation-in-part of application Ser. No. 782,743, filed Dec. 10, 1968, now abandoned.

This invention relates to bicyclic compounds. In particular, the invention pertains to 1,2-dihyro-pyrido[2,3-d] pyrimidin-2-ones from the group of 1-substituted-4-aryl-1,2 - dihydro-pyrido[2,3-d]pyrimidin-2-ones and 1-substituted - 4-aryl-1,2,3,4-tetrahydro-pyrido[2,3-d]pyrimidin-2-ones, and to methods of preparing such compounds. The invention also relates to intermediates which are useful in preparation of the above compounds and to processes for preparation of said intermediates. The invention further relates to pharmaceutical compositions and methods utilizing the said 1,2-dihydropyrido[2,3-d]pyrimidin-2-ones.

The pyrido[2,3-d]pyrimidin - 2-ones of the invention may be represented by the structural Formula I:

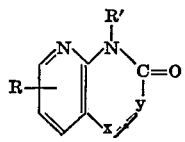

(I)

wherein:

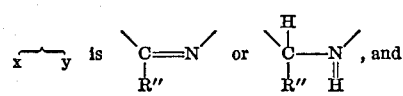

R is hydrogen or lower alkyl or 1 to 5 carbon atoms, e.g., methyl;
R' is lower alkyl of 1 to 6 carbon atoms, e.g., methyl, ethyl, propyl, isopropyl, t-butyl, etc.; allyl; methallyl; propargyl; or cycloalkyl of 3 to 6 carbon atoms, e.g., cyclopropyl; and
R" is phenyl or substituted phenyl of the formula:

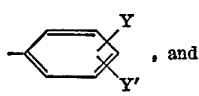

Y represents halo of atomic weight of from 19 to 80; lower alkyl of 1 to 4 carbon atoms; or lower alkoxy of 1 to 4 carbon atoms; and
Y' represents hydrogen, halo, lower alkyl or lower alkoxy (all as defined for Y).

A preferred method for preparation of compounds of Formula I in which

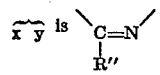

and referred to herein as Procedure A involves the cyclization of a pyridyl-phenyl ketone imine of Formula II:

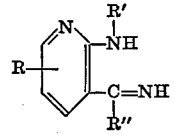

(II)

wherein R, R' and R" are as above-defined, preferably by subjecting said Compound II to reaction with phosgene, followed by working up by established techniques to obtain a 1,2 - dihydro-pyrido[2,3-d]pyrimidin - 2-one of Formula IA:

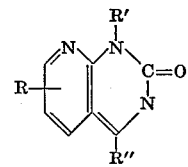

(IA)

wherein R, R' and R" are as above-defined.
An alternative method referred to herein as Procedure B for preparation of compounds I in which

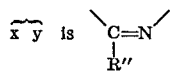

involves subjecting an alkali metal salt of a 1,2-dihydro-pyrido[2,3-d]pyrimidin-2-one of the Formula III:

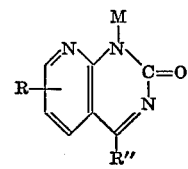

(III)

where R and R" are as above-defined, and M is an alkali metal, preferably sodium or potassium, to reaction with an organic halide of Formula IV:

R'X    (IV)

wherein R' is as above-defined, and X is halo of atomic weight of from 19 to 130, preferably iodo, followed by working up in a known manner to obtain a 1,2-dihydro-pyrido[2,3-d]pyrimidin-2-one of Formula IA.

The compounds of Formula I in which

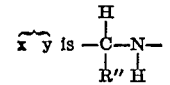

are preferably prepared from the compounds of Formula IA by a Procedure C involving subjecting a Compound IA to reduction with a borohydride to obtain a 1,2,3,4-tetrahydro-pyrido[2,3-d]pyrimidin-2-one of Formula IB:

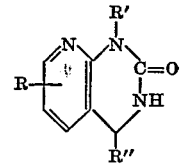

(IB)

wherein R, R' and R" are as above-defined.
The production of Compounds IA by Procedure A involving cyclization of a Compound II is preferably carried out with phosgene as the cyclizing reagent and at temperatures in the range of 0° C. to 50° C., more usually 10° C. to 30° C. The reaction of Compound II with phosgene is suitably carried out in an inert solvent which may be any of several of the conventional and well-known organic solvents. Representative of the preferred organic solvents are the aromatic solvents such as benzene, toluene, xylene and the like, more preferably benzene. The mol ratio of phosgene to Compound II is not particularly important and a substantial excess of phosgene is employed in the preferred forms of practice to obtain the more efficient reaction rates. The reaction may be carried out in the presence of an acid binding agent of known type such as a tertiary amine, e.g., a trialkyl amine such as triethylamine.

The preparation of Compounds IA by Procedure B involving reaction of the 1-metallo-pyrido[2,3-d]pyrimidin-2-one of Formula III with the organic halide of Formula IV may be carried out at temperatures of from 10° C. up to about 100° C., most conveniently at about room temperature (20° C.). Desirably, the reaction of the 1-metallo salt (III) with the appropriate halide, preferably the iodide, is carried out in the same solvent employed to prepare the 1-metallo derivative (III). The preparation of the latter is readily carried out by treating the corresponding 1-unsubstituted pyrido[2,3-d]pyrimidin-2-one in conventional manner, with any of the conventional agents commonly employed for preparing alkali metal salts, e.g., sodium hydride and the alkali metal alkoxides such as sodium methoxide, sodium ethoxide, potassium methoxide and potassium ethoxide. The formation of the salt, preferably the sodium or potassium salt, is conveniently carried out in a suitable inert organic solvent, e.g., dimethylacetamide, diethylacetamide, dimethylformamide, dimethylsulfoxide and dioxane, and at room temperature.

The preparation of Compounds IB by Procedure C is achieved by chemical reduction of a Compound IA employing an alkali metal borohydride reducing agent, e.g., sodium borohydride. The reduction is conveniently effected in a suitable organic solvent, e.g., a lower alkanol such as methanol or ethanol, and mixtures of lower alkanols with methylene chloride, chloroform or water. The reaction may be suitably carried out at temperatures in the range of 10° C. to about 80° C., preferably about 20° C. to 40° C.

As above indicated, Procedures A and B represent preferred procedures by which compounds of Formula IA may be produced. The procedure actually preferred in any given situation may vary depending upon any one of several known factors such as the particular compound to be produced, the cost and ready availability of starting materials, yields and the like. In the usual situation, the Procedure A is preferred for preparation of Compounds IA in which R' is a branched lower alkyl and the branching occurs on the carbon atom attached to the bicyclic nucleus. Procedure B is usually preferred for Compound IA in which R' is a straight-chain or otherwise branched lower alkyl or an unsaturated hydrocarbon such as allyl.

A preferred method for preparation of the pyridyl-phenyl ketone imines of Formula II employed as starting material in Procedure A involves a two-step procedure wherein in a Step 1 a 2-chloronicotinonitrile of Formula V:

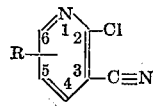

(V)

wherein R is as above-defined, is reacted with an organic amine of Formula VI:

R'NH₂ (VI)

wherein R' is as above-defined, to obtain a 2-amino-nicotinonitrile of Formula VII:

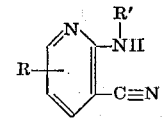

(VII)

wherein R and R'' are as defined, said Compound VII then being reacted in a Step 2 with an aryl Grignard reagent or aryl lithium compound respectively of Formulae VIII and IX:

R''MgX (VIII) and R''li (IX)

wherein R'' is as defined, and X is chloro or bromo, followed by hydrolysis and working up in a conventional manner to obtain the desired pyridyl-phenyl ketone imine of Formula II.

The preparation of Compounds VII in Step 1 by reacting a Compound V with a Compound VI is a conventional type exchange reaction carried out in a solvent medium at elevated temperatures, usually a temperature of from 100° C. to 150° C. Various organic solvents of well known types may be employed although it is usually convenient to employ an excess of Compound VI as reaction solvent. The Compound VII may be isolated from the reaction mixture of Step 1 by working by conventional procedures.

The preparation of compounds of Formula II in Step 2 by reaction of a Compound VII with an arylmagnesium halide of Formula VIII or aryl lithium Compound IX involves the usual well known type reaction preferably carried out in a solvent conventional for such reactions, for example, the acyclic or cyclic ethers such as diethyl ether, dioxane and tetrahydrofuran, preferably a cyclic ether. The usually preferred mode of carrying out Step 2 involves use of an arylmagnesium bromide of Formula VIII and temperatures usually in the range of 20° C. to 100° C., more usually 40° C. to 80° C. In preparing certain compounds of Formula II in which R is alkyl in the 4- or 6-position it is desirable for good results to employ an aryl lithium compound of Formula IX and to commence the reaction at about room temperature to limit the reaction time to a relatively short period of from say about 2 to 15 minutes, preferably 3 to 6 minutes. In general, the reaction of Step 2 is followed by controlled alkaline hydrolysis in the conventional manner. The reaction products of Formula II may be recovered from Step 2 by working according to established procedures.

The compounds of Formula V employed in Step 1 are either known or can be prepared from available materials by established procedures described in literature, for example, Org. Synth., Col. Vol. IV, pp. 166 and 704ff, and J. Am. Chem. Soc. 69, 2574. Certain of the compounds of Formula V in which R is alkyl in the 4- or 6-position are desirably prepared by reacting the corresponding 3-cyanopyridin-2-one with phosphorus oxychloride in the substantial absence of phosphorus pentachloride as exemplified hereinafter in Example 6.

The 1-metallo-pyrido[2,3-d]pyrimidin-2-ones of Formula III are prepared as above-described from their corresponding 1-unsubstituted-pyrido[2,3-d]pyrimidin-2-ones of Formula IIIA and the latter are preferably prepared in a Step 3 by subjecting an appropriately substituted 3-(2-amino)-pyridyl-phenyl ketone of Formula X:

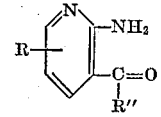

(X)

wherein R and R'' are as defined, to reaction with ethyl carbamate in the presence of a suitable Lewis acid, to obtain the 1-substituted-pyrido[2,3-d]pyrimidin-2-one of Formula IIIA:

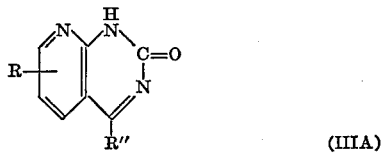

wherein R and R'' are as defined.

The preparation of Compounds IIIA by the reaction of Step 3 is carried out at elevated temperatures and desirably in the presence of a Lewis acid as catalyst, the particularly preferred catalyst being zinc chloride. Reaction temperatures are usually in the range from 160° C. to 230° C. The reaction is conveniently carried out employing an excess of the ethyl carbamate as solvent medium.

The 3-(2-amino)pyridyl-phenyl ketones of Formula X employed in Step 3 are either known or can be prepared from known materials by established procedures described in the literature, for example, by R. Littel et al., J. Med. Chem. 5, 722 (1965).

The compounds of Formula IA may also be prepared by Procedure referred to herein as Procedure A–I involving the cyclization of a pyridyl-phenyl ketone of the Formula XI:

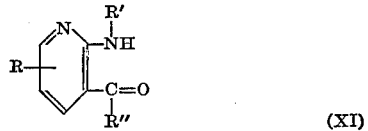

wherein R, R' and R'' are as defined above, with an alkyl carbamate in which the alkyl is of 1 to 5 carbon atoms, at elevated temperatures.

Process A–1 is suitably carried out at temperatures of from 140° C. to 200° C., preferably 160° C. to 180° C. The mole ratio of carbamate to the compound of Formula XI is not critical. In the preferred forms of practice, there is employed a substantial excess of carbamate which also serves as the preferred solvent for the reaction. Other suitable high boiling organic solvents which are inert under the reaction conditions may alternatively or additionally be employed if desired. The especially preferred carbamate is urethane. The reaction time may for example range from ½ to 10 hours, more usually 1 to 4 hours. The cyclization with the carbamate is desirably conducted in the presence of a Lewis acid as catalyst for the reaction. The amount of Lewis acid employed is preferably between about 5% to 20% based on the weight of compound of Formula XI in the reaction mixture. The preferred catalyst is zinc chloride.

The compounds of structural Formula I are useful because they possess pharmacological activity in animals. In particular, the compounds are useful as anti-inflammatory agents as indicated by the Carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about .5 milligram to about 150 milligrams per kilogram of body weight, preferably given in divided doses 2 to 4 times a day, or in sustained release form. For most mammals the administration of from about 35 milligrams to about 1000 milligrams of the compound per day provides satisfactory results and dosage forms suitable for internal administration comprise from about 10 milligrams to about 500 milligrams of the compound in admixture with a solid or liquid pharmaceutical carrier or diluent.

A representative formulation is a tablet prepared by conventional tabletting techniques and containing the following:

| Ingredients: | Parts by weight |
|---|---|
| 1-isopropyl-4-phenyl-pyrido[2,3-d]pyrimidin-2-one | 50 |
| Tragacanth | 2 |
| Lactose | 29.5 |
| Corn starch | 5 |
| Talcum | 3 |
| Magnesium stearate | 0.5 |

From the standpoint of anti-inflammatory activity based on the above-mentioned test, a preference is indicated for the Compounds I in which R' is isopropyl and/or those Compounds I in which

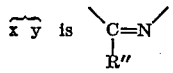

i.e., the compounds of Formula IA, especially the compounds of Formula IA in which R' is isopropyl. As is often the case with compounds exhibiting anti-inflammatory activity, Compounds I within the scope of the invention also exhibit anti-bradykinin activity as demonstrated on intravenous administration to the guinea pig, for example, in doses of 100 to 5000 micrograms per kilogram of body weight.

The following examples show representative compounds encompassed within the scope of this invention and the manner in which such compounds are prepared. However, it is to be understood that the examples are for purposes of illustration only.

EXAMPLE 1

1-isopropyl-4-phenyl-1,2-dihydro-pyrido[2,3-d]pyrimidin-2-one

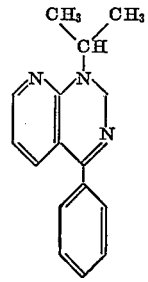

STEP A

Preparation of 2-isopropylamino-nicotinonitrile

A solution of 15 g. of 2-chloro-nicotinonitrile in 75 ml. isopropyl amine in an autoclave is heated for 4 hours at 130°–140° C. The mixture is then cooled, transferred with chloroform into a flask and evaporated to dryness. The residue is dissolved in chloroform, extracted twice with water, the organic phase dried over sodium sulfate and evaporated in vacuo. The residue is dissolved in 100 ml. pentane and kept at 0° overnight to crystallize out and obtain 2-isopropylamino-nicotinonitrile, M. P. 50–55° C.

STEP B

Preparation of 3-(2-isopropylamino)pyridyl-phenyl ketone imine

A solution of 20 g. of 2-isopropylaminonicotinonitrile in 150 ml. tetrahydrofuran at 30°–40° C. is added to a phenylmagnesium bromide solution in tetrahydrofuran (prepared from 9.0 g. of magnesium and 59 g. of bromobenzene in 150 ml. tetrahydrofuran). This mixture is reflux for 24 hours, cooled and poured on ice [1 kg.]. The resulting mixture is extracted three times with methylene chloride, the organic phase combined and washed with water, dried over sodium sulfate and evaporated in vacuo to obtain a crude liquid of 3[2-isopropylamino] pyridyl-phenyl ketone imine.

STEP C

Preparation of 1-isopropyl-4-phenyl-1,2-dihydro [2,3-d]pyrimidin-2-one

To a solution of 32 g. of crude 3[2-isopropylamino] pyridylphenyl ketone imine and 60 ml. of triethylamine in 600 ml. benzene is added 183 ml. of a 12.5% phosgene solution in benzene. After a few minutes a yellow precipitate is formed and the reaction is stirred for 30 minutes. The precipitate is then filtered off, washed with benzene, dissolved in methylene chloride and the solution extracted once with 50 ml. 2 N sodium hydroxide solution and three times with water. The solution is then dried over soddium sulfate and evaporated in vacuo to obtain a crude product which is crystallized twice from methylene chloride-diethyl ether to obtain 1-isopropyl-4-phenyl-1,2-dihydro[2,3-d]pyrimidin-2-one, M.P. 193–195° C. Additional product is obtained by working up the benzene wash liquid.

EXAMPLE 2

1-isopropyl-4-phenyl-1,2,3,4-tetrahydro-pyrido[2,3-d] pyrimidin-2-one

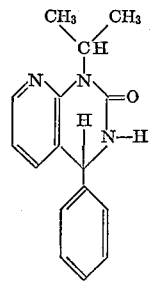

A solution of 2.65 g. of 1-isopropyl-1,2-dihydro-pyrido [2,3-d]pyrimidin-2-one in 50 ml. 95% ethanol is stirred and 2.0 g. of sodium borohydride is added in portions. The mixture is then stirred at room temperature for 3 hours, and 200 ml. of water added to obtain a precipitate which is filtered off, washed with water and dried at 50° (0.5 mm.). The crude material is recrystallized from methylene chloride/ether (1:1) to obtain 1-isopropyl-4-phenyl - 1,2,3,4-tetrahydro-pyrido[2,3-d]pyrimidin-2-one, M.P. 148–150° C.

EXAMPLE 3

1-methyl-4-phenyl-1,2-dihydro-pyrido[2,3-d] pyrimidin-2-one

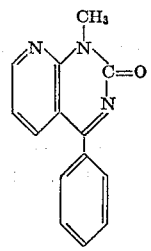

STEP A

Preparation of 4-phenyl-3,2-dihydro-pyrido[2,3-d] pyrimidin-2-one

A mixture of 4.6 g. of 3-(2-amino)pyridylphenyl ketone, 18.4 g. of ethyl carbamate and 500 mg. of zinc chloride is heated at 210–220° C. for 45 minutes. The resulting mixture is cooled, the resulting solid treated with hot chloroform and the insoluble material is filtered off. The chloroform solution is three times extracted with water, dried over sodium sulfate and evaporated in vacuo. The residue is dissolved in methylene chloride and crystallized therefrom to obtain 4-phenyl-3,2-dihydro-pyrido[2,3-d] pyrimidin-2-one, M.P. 243–248° C.

STEP B

Preparation of 1-methyl-4-phenyl-1,2-dihydro-pyrido [2,3-d]pyrimidin-2-one

To a suspension of 2 g. of 4-phenyl-1,2-dihydro-pyrido [2,3-d]pyrimidin-2-one in 25 ml. dimethylacetamide is added 0.468 g. of sodium hydride (57% in mineral oil). After 5 minutes a precipitate is formed and 10 ml. of dimethylacetamide is added. After stirring for 60 minutes at room temperature there is added 1.4 ml. of methyl iodide and the resulting brown solution is stirred overnight at room temperature. Water and ice are added and the resulting crystalline precipitate is filtered off and washed with water. The precipitate is taken up in methylene chloride, the solution dried over sodium sulfate, treated with charcoal, filtered and evaporated in vacuo. The residue is dissolved in ethanol and crystallized therefrom to obtain 1-methyl-4-phenyl-1,3-dihydro-pyrido [2,3-d]pyrimidin-2-one, M.P. 197–198° C.

EXAMPLE 4

Following the procedure of Example 1, above, and employing approximately equivalent amounts, the compound which is 3 - (2 - tert - butylamino)pyridyl-phenyl ketone imine is prepared and reacted with posgene to obtain on crystallization from diethyl ether/pentane (1:1) the compound which is 1-tert-butyl-4-phenyl-1,2-dihydro-pyrido [2,3-d]pyrimidin-2-one, M.P. 138–141° C.

EXAMPLE 5

Following the procedure of the preceding example the following compounds of the invention are prepared:

(A) 1 - cyclopropyl - 4-phenyl-1,2,3,4-tetrahydropyrido- [2,3-d]pyrimidin-2-one, M.P. 179–181° C. (Crystallization from methanol/pentane.)
(B) 1 - cyclopropyl - 4- phenyl-1,2-dihydro-pyrido[2,3-d] pyrimidine-2-one, M.P. 155–159° C. (Recrystallization from ethanol/diethyl ether (2:1).)
(C) 1 - ethyl - 4 - phenyl - 1,2-dihydro-pyrido[2,3-d] pyrimidin-2-one, M.P. 181–184° C. (Crystallization from methylene chloride/diethyl ether.)
(D) 1 - isopropyl - 4 - (4' - methylphenyl)-1,2-dihydro-pyrido[2,3-d]pyrimidin-2-one, M.P. 149–152° C.
(E) 1 - isopropyl - 4 - (3',4' - dichlorophenyl)-1,2-dihydropyrido[2,3-d]pyrimidine - 2 - one, M.P. 168–172° C.
(F) 1 - isopropyl - 4 - (4'-chlorophenyl)-1,2-dihydro-pyrido[2,3-d]pyrimidin-2-one, M.P. 180–183° C.
(G) 1 - isopropyl - 4,(4'-methoxyphenyl)-1,2-dihydro-pyrido[2,3-d]pyrimidine-2-one, M.P. 133–137° C.
(H) 1 - propargyl - 4 - phenyl-pyrido[2,3-d]pyrimidin-2-one, M.P. 175–178° C.

EXAMPLE 6

1-Isopropyl-7-methyl-4-phenyl-1,2-dihydro-pyrido[2,3-d] pyrimidin-2-one

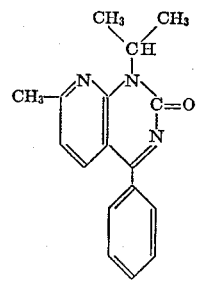

STEP A

Preparation of 2-chloro-3-cyano-6-methylpyridine

A suspension of 26.8 g. of 3-cyano-6-methyl-pyridin-2-one in 200 ml. of phosphorus oxychloride is refluxed for 1½ hours. The resulting mixture is evaporated to near dryness, the residue poured over ice cold 2 N sodium hydroxide, and then made basic with additional 2 N sodium hydroxide. The resulting mixture is extracted twice with methylene chloride, washed once with 2 N sodium hydroxide and twice with water, dried and evaporated in vacuo. The residue is dissolved in methylene chloride, treated with charcoal and a little alumina and crystallized by adding diethyl ether to obtain 2-chloro-3-cyano-6-methylpyridine, M.P. 113–115° C.

STEP B

Preparation of 3-cyano-2-isopropylamino-6-methyl-pyridine

A mixture of 10.0 g. of 2-chloro-3-cyano-6-methyl-pyridine and 90 ml. of isopropylamine is heated in a sealed bomb at 140° C. for 2½ hours with occasional shaking. The resulting mixture is evaporated to dryness, dissolved in diethyl ether, washed three times with water and once with saturated sodium chloride solution, dried and evaporated in vacuo. The residue is dissolved in diethyl ether and pentane added to crystallize 3-cyano-2-isopropylamino-6-methyl-pyridine, M.P. 103–105° C.

STEP C

Preparation of 6-methyl-3-(2-isopropylamino)pyridyl-phenyl ketone imine

To a stirred solution of 4.4 g. of 3-cyano-2-isopropyl-amino-6-methylpyridine in 100 ml. of tetrahydrofuran is added dropwise over 5 minutes about 50 ml. of 2.1 N solution of phenyl lithium at about room temperature. The mixture is stirred for an additional 5 minutes, poured onto ice, made basic with sodium hydroxide solution, extracted twice with diethyl ether, washed with saturated sodium chloride solution, dried and evaporated in vacuo to obtain an oil of 6-methyl-3-(2-isopropyl-amino)pyridyl-phenyl ketone imine.

STEP D

Preparation of 1-isopropyl-7-methyl-4-phenyl-1,2-dihydropyrido[2,3-d]pyrimidin-2-one A solution of 6-methyl-3-(2-isopropylamino)pyridyl-phenyl ketone imine as obtained above in 50 ml. of benzene is added dropwise to a solution of 50 ml. of 12.5% solution of phosgene in benzene and 2.5 ml. of triethylamine in 100 ml. of benzene over a period of about 20 minutes. This mixture is stirred for 15 minutes, poured onto ice cold 6 N hydrochloric acid solution, the aqueous layer extracted with benzene and made basic with 2 N sodium hydroxide solution at ice temperatures. The mixture is then extracted with methylene chloride, washed twice with water, dried and evaporated in vacuo to obtain an oil which is subjected to chromatography to obtain a third fraction employing methylene chloride and 5% mathanol as eluant. Said third fraction is dissolved in methylene chloride, filtered over charcoal, crystallized by adding diethyl ether and recrystallized from diethyl ether to obtain 1 - isopropyl - 7-methyl-4-phenyl-1,2-dihydro-pyrido[2,3-d]pyrimidin-2-one, M.P. 156–158° C.

There is also obtained as a by-product an oil of the compound 6 - methyl-3-(2-isopropylamino)pyridyl-phenyl ketone.

EXAMPLE 7

1-isopropyl-7-methyl-4-phenyl-1,2-dihydro-pyrido[2,3-d] pyrimidin-2-one

A mixture of 50 mg. of 6-methyl-3-(2-isopropylamino) pyridylphenyl ketone as obtained as by-product in Example 10, 200 mg. of urethane and a trace amount of zinc chloride is heated at 160° C. on an oil bath. The resulting melt solidifies and is dissolved in methylene chloride, filtered, washed with water and worked up as in Example 11 to obtain 1-isopropyl-1-methyl-4-phenyl-1,2-dihydropyrido[2,3-d]pyrimidin-2-one, M.P. 156–158° C.

What is claimed is:
1. A compound of the formula:

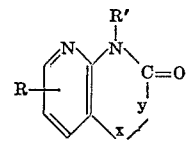

wherein:

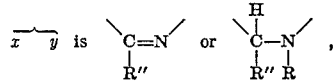

R is hydrogen or lower alkyl,
R' is lower alkyl; allyl; methallyl; propargyl; or cyclo-alkyl of 3 to 6 carbon atoms; and
R" is phenyl or substituted phenyl of the formula:

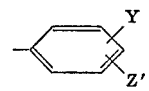

Y represents halo; lower alkyl; lower alkoxy; and
Y' represents hydrogen, halo, lower alkyl or lower alkoxy.
2. A compound of claim 1 in which

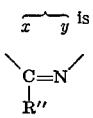

3. A compound of claim 2 in which R" is phenyl.
4. The compound of claim 2 which is 1-isopropyl-4-phenyl-1,2-dihydro-pyrido[2,3-d]pyrimidin-2-one.
5. The compound of claim 2 which is 1-methyl-4-phenyl-1,2-dihydro-pyrido[2,3-d]pyrimidin-2-one.
6. The compound of claim 2 which is 1-tert-butyl-4-phenyl-1,2-dihydro-pyrido[2,3-d]pyrimidin-2-one.
7. The compound of claim 2 which is 1-ethyl-4-phenyl-1,2-dihydro-pyrido[2,3-d]pyrimidin-2-one.
8. The compound of claim 2 which is 1-isopropyl-7-methyl-4-phenyl - 1,2 - dihydro-pyrido[2,3-d]pyrimidin-2-one.
9. A compound of claim 2 in which R' is lower alkyl.
10. A compound of claim 9 in which R is hydrogen.
11. A compound of claim 9 in which R' is isopropyl.
12. A compound of claim 11 in which R is methyl.
13. A compound of claim 1 in which

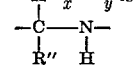

14. A compound of claim 13 in which R' is lower alkyl.
15. A compound of the formula:

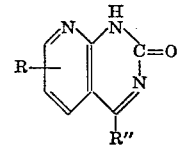

wherein R and R" are as defined in claim 1.

References Cited

UNITED STATES PATENTS 3,320,257   5/1967   Lesher _____ 260—256.4 F

RICHARD J. GALLAGHER, Primary Examiner

U.S. Cl. X.R.

260—294.9, 296 R